Patented Oct. 7, 1941

2,258,026

UNITED STATES PATENT OFFICE 2,258,026

METHOD OF PRODUCING ABRASIVE ARTICLES

Harold B. Morris, Somerset, Mass., assignor to The Firestone Tire & Rubber Company, Akron, Ohio, a corporation of Ohio No Drawing. Application August 19, 1938, Serial No. 225,776

5 Claims. (Cl. 51—299)

This invention relates to abrasive articles, more especially to methods for manufacturing abrasive articles which are bonded with rubber, and the like.

In preparing rubber bonded abrasive articles, it is difficult to secure adhesion between the abrasive grain, or particle and the rubber bonding material used to hold the particles together. Obviously the usefulness and life of the article directly depends on the strength of this bond.

The object of this invention is to improve the aforementioned bond in a commercially satisfactory manner and to provide a novel method of preparing abrasive articles; also to prepare abrasive particles for being bonded into articles so that the particles can be firmly embedded in the bonding material.

The foregoing and other objects are achieved by practicing the present invention which, broadly speaking, comprises stirring a plasticizer thoroughly into the abrasive particles and then adding a dehydrating powder to the abrasive to form a coating on the abrasive particle. A latex bonding material is then stirred into these coated abrasive particles and the mixture is allowed to stand several minutes preferably at an elevated temperature in order to thicken the bonding material. After that a lubricant is mixed into the resulting composition and the mass dried. This produces a substantially non-coherent granular mass which can be readily handled and which is adapted to be pressed into article form and vulcanized to obtain the desired product.

Example I

The invention has been practiced by mixing about 2 g. of a plasticizer, or mineral rubber cement, with about 100 g. of a suitable abrasive substance, such as one known to the trade as "Borolon," which abrasive is used in any desired particle size. The plasticizer used in the invention may comprise about 1 part rubber, 1 part mineral rubber, and 3 parts gasoline. This plasticizer is thoroughly mixed with the abrasive particle so that it moistens, or wets the entire periphery of the particles. Then about 3½ parts of a powdered dehydrator, such as a mixture of magnesium oxide and zinc oxide, which has given excellent results, is added to the moistened abrasive particles to dry the aqueous bond later added thereto and also to aid in coagulating that bond. These oxides cling to the moistened abrasive particles and form a coating thereon which is held to the particle by the plasticizer. Next a latex bonding material is added to the coated abrasive particles and thoroughly mixed therewith. A bonding material which may be used in the practice of the invention comprises about 166 parts of 60% latex, about 1 part of a 50% butyl zimate aqueous dispersion, about 100 parts of a 50% aqueous dispersion of sulfur, about 6 parts ammonium sulfate and about 100 parts of water. The latex used in this bond is preferably partially prevulcanized. In all events, it will be observed that there is a high sulfur to rubber ratio, which acts to yield a hard-rubber bond in the finished article. The above mixture is permitted to set to a more or less smeary consistency, this usually occurring in from 5 to 10 minutes after addition of the latex bonding material, or bond. Ordinarily the temperature of the mixture should be elevated to about 200° F. while setting. The obtained mixture tends to become granular on stirring and usually is somewhat tacky at this stage, due to residual moisture being present. About 2 parts of finely divided hard-rubber dust is stirred into the mixture to lubricate the granular particles from each other. The hard-rubber dust also serves as a drying, or filling material and is useful when the composition is vulcanized, due to its absorbent tendency which reduces blowing in the final article.

After adding the hard-rubber dust, the mixture is dried, preferably by spreading the mixture in a thin layer over a fine screen. In this particular example of the invention, the mixture was dried 2 hours at 160° F. It is important that most of the residual moisture be removed in the drying operation for excess moisture may cause blowing during vulcanization, this resulting in a porous product.

The desired article can readily be formed from the substantially non-coherent, granular structure prepared as above. Thus, the composition is pressed to article form in a platen press and then vulcanized while retained in such form. In this example, substantially 1000 pounds per square inch pressure was used to form a wheel one-half inch thick, which wheel was vulcanized for 90 minutes at 320° F. Of course, other articles may require different vulcanization periods.

Example II

In another instance, 4 parts of plasticizer were added to 100 parts of abrasive and 10 parts of zinc oxide-magnesium oxide mixture were added to the abrasive particles. Then 33 parts of the latex bond were mixed with the abrasive and 2 parts of hard-rubber dust added to the resulting composition which was processed as in the foregoing example.

Example III

The invention may be practiced by adding the hard-rubber dust to the abrasive particles prior to mixing them with the latex bond. Thus, about 8 parts of plasticizer are added to 200 parts of abrasive, then 6 parts of dehydrator and 5 parts of hard-rubber dust are added to the abrasive particles. After this is thoroughly mixed, 50 parts of latex bond are added and stirred into the composition. The remainder of the process is as given above except that no hard-rubber dust is added to the set latex mixture.

*Example IV*

When a higher percentage of bonding material is desired in the final product, the invention may be practiced by mixing 4 parts of plasticizer with 200 parts of abrasive and later adding about 7 parts of dehydrator thereto. About 50 parts of the latex bond are mixed with the abrasive substance and the composition allowed to set, as in Example I. Next 3 parts of a dehydrator are added to the granular substance obtained after which 50 more parts of latex bond may be added and mixed with the composition. Then about 5 parts of hard-rubber dust are added and the composition dried and processed as in Example I.

Sometimes it may be desirable to add wood flour, asbestos, or the like to the latex-abrasive mixture prior to vulcanization to secure what is known in the grinding wheel art as "clearance" in the finished article.

It will be observed that other substances may be substituted for the specific ingredients mentioned, such as zinc stearate for the lubricant, hard-rubber dust. Other suitable dehydrators, such as litharge, lime, clay, or a hydrophilic substance, for example, glue, casein, or gelatine, may be used in place of the oxides mentioned, while the specific composition of the latex bond may vary since any desired vulcanizate may be used. The plasticizer serves the double purpose of adhering the dehydrator to the abrasive and aiding flow of the bond during vulcanization. Thus other viscous materials, which are adhesive and thermoplastic, may replace the specific plasticizer composition mentioned. Obviously, the specific proportions mentioned need not be strictly adhered to in order to secure the desirable results of the invention.

Practice of the invention has shown that treating the abrasive particles with the plasticizer and dehydrator so as to obtain coatings thereof on the abrasive particles serves to produce a very good bond between the latex bonding material and the abrasive particles. I believe that this feature of the invention results from the dehydrator-plasticizer combination either reacting or dissolving during vulcanization to aid in securing a good bond, which is highly desirable since it improves the strength of the resultant article. It also should be noted that the product obtained in practicing the invention, prior to pressing the obtained product into article form, is of a dry, non-coherent, granular form that can readily be handled and shaped, as desired.

The word "latex" in the specification and claims is meant to include both natural and artificial rubber dispersions, as well as dispersions of rubber-like materials.

In accordance with the patent statutes, I have described several complete embodiments of the invention and the method of compounding same. However, it will be understood that various modifications of my invention can be made without departing from the scope thereof as defined in the appended claims.

What is claimed is:

1. That process of forming an abrasive article including the steps of thoroughly moistening abrasive particles with a rubber cement including rubber, mineral rubber and gasoline, stirring a mixture of magnesium oxide and zinc oxide into the moistened abrasive particles to coat the surfaces thereof, admixing a vulcanizable partially prevulcanized latex bonding material including latex, butyl zimate, sulfur and ammonium sulfate into the abrasive particles, allowing the mixture to stand several minutes at an elevated temperature to thicken the bonding material, adding hard-rubber dust to the mixture and mixing it therein, drying the mixture to obtain a crumbly relatively non-coherent mass, pressing the mass to article form, and vulcanizing the mass to produce the final article.

2. That process of forming an abrasive article including the steps of moistening abrasive particles with a rubber cement, stirring a mixture of magnesium oxide and zinc oxide into the moistened abrasive particles to coat upon the surfaces thereof, admixing a partially prevulcanized latex bonding material into the abrasive particles, admixing hard-rubber dust with the mixture, admixing asbestos with the mixture to produce clearance in the finished article, drying the mixture to obtain a crumbly mass, pressing the mass to article form, and vulcanizing the mass to produce the final article.

3. That process of forming an abrasive article including the steps of wetting abrasive particles with a liquid rubber composition, covering the wetted particles with a dehydrator, mixing a vulcanizable latex bonding composition with the covered abrasive particles, allowing the composition to set for a short interval at an elevated temperature, mixing a lubricant into the composition, drying the composition to obtain a crumbly mass, pressing the mass to article form, and vulcanizing the mass while retained in article form.

4. In a process for forming an abrasive article the steps of thoroughly moistening abrasive particles with a rubber cement, stirring a mixture of magnesium oxide and zinc oxide into the moistened abrasive particles to coat the surfaces thereof, admixing a partially prevulcanized latex bonding material into the abrasive particles, allowing the mixture to stand several minutes at an elevated temperature to thicken the bonding material, and admixing hard-rubber dust with the mixture.

5. That process of forming an abrasive article comprising coating abrasive particles with a liquid rubber composition, dehydrating the coating on the abrasive particles by mixing a dry dehydrator power therewith, mixing a vulcanizable aqueous rubber dispersion with the dehydrated abrasive particles, depositing rubber upon the abrasive particles, admixing further dehydrator powder with the rubber coated abrasive particles, mixing more vulcanizable aqueous rubber dispersion with the abrasive particles, and drying the resulting mixture to obtain abrasive particles having an appreciable quantity of rubber associated therewith.

HAROLD B. MORRIS.

CERTIFICATE OF CORRECTION.

Patent No. 2,258,026.    October 7, 1941.

HAROLD B. MORRIS.

It is hereby certified that error appears in the printed specification of the above numbered patent requiring correction as follows: Page 2, second column, line 61, claim 5, for the word "power" read --powder--; and that the said Letters Patent should be read with this correction therein that the same may conform to the record of the case in the Patent Office.

Signed and sealed this 25th day of November, A. D. 1941.

Henry Van Arsdale,
Acting Commissioner of Patents.

(Seal)